UNITED STATES PATENT OFFICE.

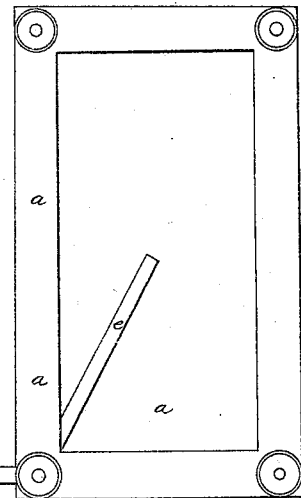
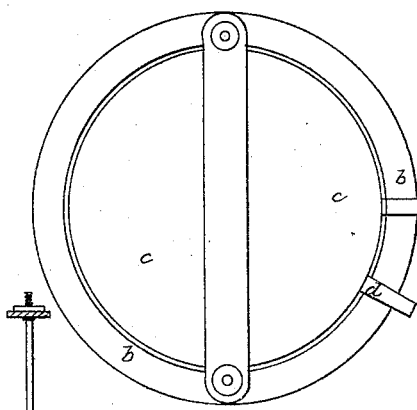
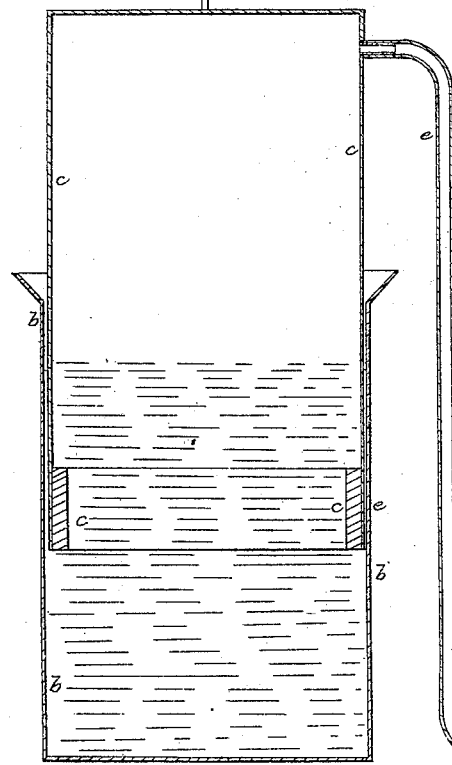
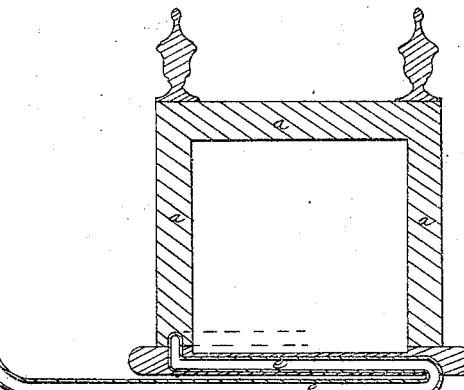

J. A. CUTTING, OF BOSTON, MASSACHUSETTS.

IMPROVEMENT IN AQUARIA.

Specification forming part of Letters Patent No. 31,657, dated March 12, 1861.

*To all whom it may concern:*

Be it known that I, J. A. CUTTING, of Boston, in the county of Suffolk and State of Massachusetts, have invented certain new and useful Improvements in Aquaria; and I do hereby declare that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

The figures of the accompanying plate of drawings represent my improvements. Figure 1 is a plan or top view. Fig. 2 is a central longitudinal vertical section.

My improvements are designed to effect the purpose of supplying aquaria for containing fishes, aquatic plants, &c., with fresh air.

It is well known that the carbonic-acid gas exhaled from fishes kept in tanks will, unless the water is constantly changed, so impregnate it as to destroy life. By passing through the tanks a constant supply of fresh air the carbonic-acid gas is carried off and neutralized; and the present invention consists in a new mode of supplying the water of aquaria with fresh air by means of a reservoir of compressed air, filled in any proper manner, which so operates and is so connected with a tank containing water, fishes, &c., as to gradually force into and keep up therein a supply of air.

There are, of course, various modes in which a reservoir may be filled with air and arranged so as to deliver the same through suitable pipes or connections in any desired quantities to the tanks or aquaria; but the method I prefer I will now proceed to describe in detail.

*a a a a* in the drawings represent a tank or aquarium for containing fishes, aquatic plants, &c., and wholly or partially filled with water. *b b* is a stationary cylinder or other shaped receptacle, partially filled with water, within which is inserted another cylinder or vessel, *c c*, so as to be free to play up and down therein. The inner cylinder, *c c*, I supply with air by means of a pump, bellows, or otherwise, through an aperture, *d*, until it has received the desired supply, when the aperture *d* is closed. Then the cylinder *c c* is allowed to descend gradually by its own weight, and thus compress the air contained in it between the top thereof and the surface of the outer receptacle, *b b*. The inner vessel, *c c*, being connected by means of a flexible pipe, *e e*, with the tank or aquarium *a a*, will thus constantly force into the tank *a a* a supply of air until it has wholly descended, when it can be again charged with air, as before.

In lieu of the inner and outer cylinders, *c c* and *b b*, it will be evident that a reservoir may be charged with air under pressure and connected with an aquarium, as in the manner hereinabove described, the quantity of air delivered to the aquarium being regulated by cocks or otherwise.

Having thus described my improvements, I shall state my claim as follows:

What I claim as my invention, and desire to have secured to me by Letters Patent, is—

The combination of a tank or aquarium for containing water, fishes, aquatic plants, &c., with a reservoir of air, said reservoir so operating as to gradually force into and keep up a supply of air in the said tank, as set forth.

J. A. CUTTING.

Witnesses:
 JOSEPH GAVETT,
 A. W. BROWN.